United States Patent
Cwik et al.

(10) Patent No.: US 6,644,115 B2
(45) Date of Patent: Nov. 11, 2003

(54) METHOD AND DEVICE FOR INDICATING LIQUID VOLUME IN A TANK

(75) Inventors: Terry Thomas Cwik, Salem, MI (US); Bradley Jerome Corbin, Flat Rock, MI (US); Jeffrey Todd Kanoza, Troy, MI (US); Thomas Gerald Burke, Bloomfield, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/027,552

(22) Filed: Dec. 21, 2001

(65) Prior Publication Data
US 2003/0115953 A1 Jun. 26, 2003

(51) Int. Cl.[7] ............................................. G01F 23/00
(52) U.S. Cl. ...................................... 73/290 R; 73/291
(58) Field of Search ............................... 73/290 R, 291, 73/488, 866.1

(56) References Cited

U.S. PATENT DOCUMENTS

| | | | |
|---|---|---|---|
| 4,386,406 A | * 5/1983 | Igarashi et al. | ............. 364/442 |
| 4,402,048 A | 8/1983 | Tsuchida et al. | ............. 364/442 |
| 4,470,296 A | 9/1984 | Kobayashi et al. | ............. 73/113 |
| 4,516,121 A | * 5/1985 | Moriyama et al. | ..... 340/825.05 |
| 4,542,460 A | * 9/1985 | Weber | ........................ 364/424 |
| 4,611,287 A | 9/1986 | Kobayashi et al. | ......... 364/442 |
| 4,890,491 A | 1/1990 | Vetter et al. | ............... 73/290 R |
| 4,912,646 A | 3/1990 | Cerruti | ....................... 364/509 |
| 5,371,500 A | 12/1994 | Lippmann et al. | .......... 341/155 |
| 5,752,409 A | 5/1998 | Lippmann et al. | ........ 73/290 R |
| 5,826,459 A | 10/1998 | Kataoka et al. | ........... 73/290 R |

* cited by examiner

Primary Examiner—Hezron Williams
Assistant Examiner—Rodney Frank
(74) Attorney, Agent, or Firm—Brinks Hofer Gilson & Lione

(57) ABSTRACT

A system for determining a level of a liquid present in a storage container in an automobile is disclosed. The system has a liquid level sensor for determining a preliminary liquid level of the liquid stored in the storage container, an ignition key position sensor for determining an ignition position, a vehicle speed sensor for determining the automobile's speed, a transmission gear selection sensor for determining a transmission gear position of a transmission of the automobile, and a processor. The processor receives input signals from the liquid level sensor, ignition key position sensor, the vehicle speed sensor and the transmission gear selection sensor for calculating the level of the liquid in the storage container.

18 Claims, 5 Drawing Sheets

METHOD AND DEVICE FOR INDICATING LIQUID VOLUME IN A TANK

TECHNICAL FIELD

The present invention relates to systems and methods for determining the level of a liquid contained within a storage tank carried on an automotive vehicle.

BACKGROUND

Automotive vehicles today contain a variety of liquids for use in the operation of the vehicle. For example, the fluids may include fuel, engine coolant, window washer fluid, brake fluid, and engine lubrication fluid. To ensure proper operation of the automotive vehicle, it is essential that liquid levels are accurately determined.

There are several phenomena that can affect the liquid level reading. These phenomena include agitation of the liquid within the container during movement of the vehicle. For example, during acceleration, deceleration, and driving on inclines and declines. Also, the change in level but not volume occurring from parking on inclines and declines as well as the change in level and volume due to the addition of liquid or a leak from the container can cause an inaccurate liquid level reading. Although prior art systems and methods work for their intended purpose, these and other problems have not been adequately addressed.

Therefore, there is a need for a new and improved method and system for determining the level of a liquid in a container. This system and method should provide an accurate liquid level reading during normal vehicle operation. Further, the new and improved method and system for determining liquid level should compensate for vehicle movement, parking on inclines or declines, and changes in volume due to leaks or addition of liquid.

SUMMARY

In an aspect of the present invention, a system is provided for determining a liquid level in an automotive vehicle storage tank. In an embodiment of the present invention, the liquid level indication system has a storage tank, sender card, float rod and float, electrical wiring, liquid level gauge, and low liquid level light. The liquid level indication system is in communication with a vehicle communication network which provides vehicle speed, ignition key position and transmission gear select position inputs. A preliminary liquid level indication is acquired and the information received from the vehicle communication network is used to adjust the preliminary liquid level indication to arrive at a final liquid level indication.

Further aspects, features and advantages of the invention will become apparent from consideration of the following description and the appended claims when taken in connection with the accompanying drawings.

DETAILED DESCRIPTION

Figure 1:
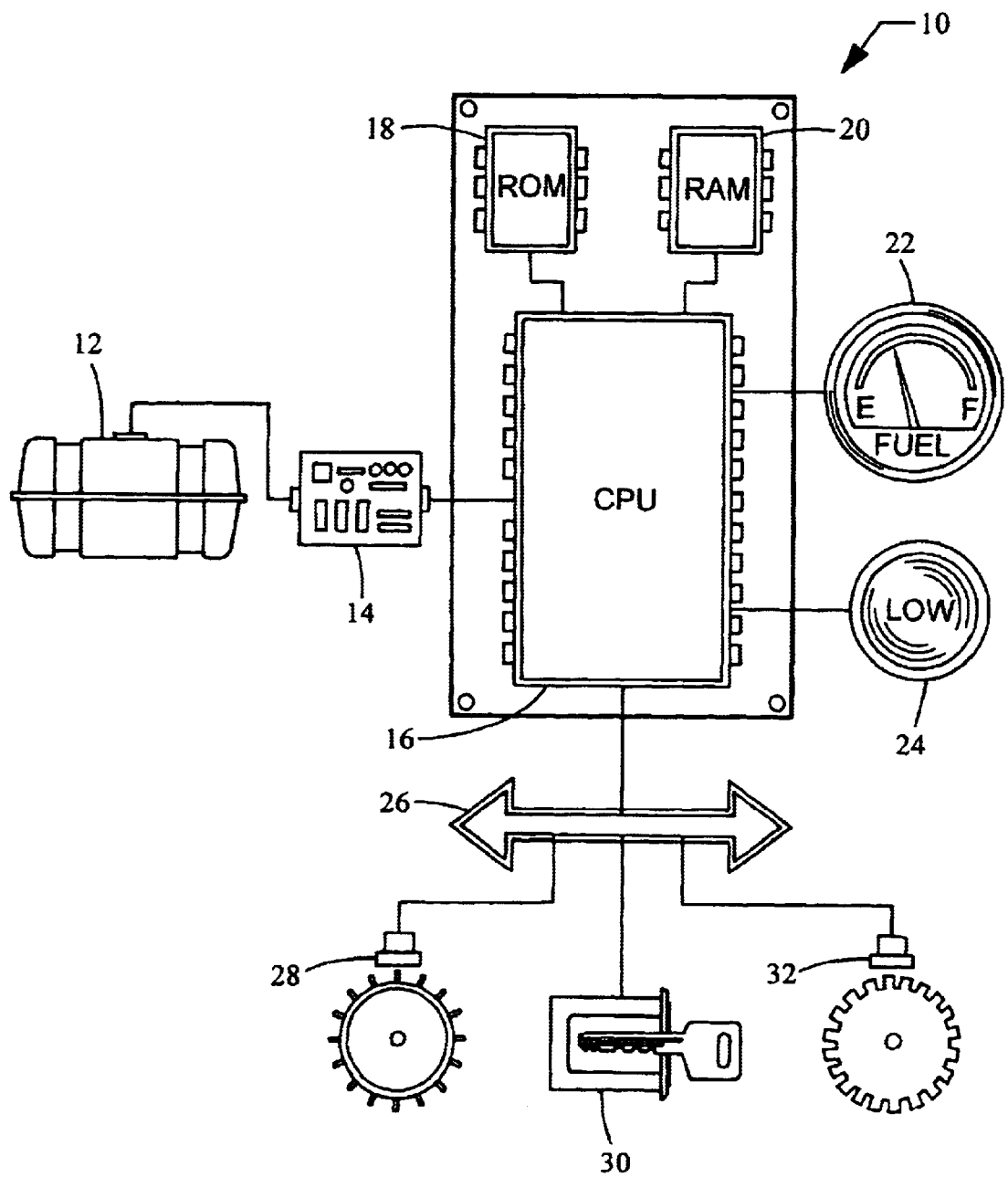
FIG. 1 is a block diagram illustrating a liquid level indication system, in accordance with the present invention.

With reference to FIG. 1 a liquid level indication system 10 is illustrated, in accordance with the present invention. System 10 includes a storage tank 12, a liquid level sender card 14, a processor 16, memory devices 18 and 20, liquid level indicator gauge 22 and a low level indicator light 24. Processor 16 is in communication with a vehicle bus 26. Vehicle bus 26, in one embodiment of the present invention, is an in-vehicle communications network for sending and receiving control and data signals. In another embodiment of the present invention, a vehicle speed sensor 28 is in communication with the vehicle bus 26 for sending speed data to the processor 16. Other sensors such as an ignition key sensor 30 and a gear select sensor 32 are provided for sending information related to ignition key position and transmission gear position to processor 16.

Liquid level indication system 10 includes software code executable on processor 16 and stored in memory devices 18 and 20 for carrying out system functions. For example, a liquid level processing routine is provided to read an analog to digital converter on sender card 14. The liquid level processing routine provides a ratio (RAD) of the liquid level to battery voltage periodically. In an embodiment of the present invention, liquid level processing routine is completed at least every 120 milliseconds in order to capture an accurate profile of the liquid level.

There are two basic types of liquid level senders 14, forward and reverse. The present invention contemplates using either a forward or a reverse liquid level sender. A forward sender is one in which the sender card resistance increases with increasing liquid level volume, in contrast, a reverse sender is one in which the sender card resistance decreases with increasing liquid level volume. Preferably, a forward sender is used in system 10 to provide a more accurate liquid level reading since the liquid level sender reading error is smaller at lower resistance values, providing better accuracy at a near empty tank condition.

In a preferred embodiment, the liquid level reading is ratioed to its supply voltage (sbatt) to compensate for any errors due to battery voltage fluctuations and differing regulator voltages. In yet another embodiment of the present invention, a voltage divider circuit instead of a precision reference voltage and a regulated supply voltage is used, providing a reduced system cost. The ratio (RAD) must always be less than one, otherwise the result will be inaccurate. Thus, hardware scaling is very important and should always ensure that the ratio is less than one over the entire voltage range or software error handling would be required.

Figure 2:
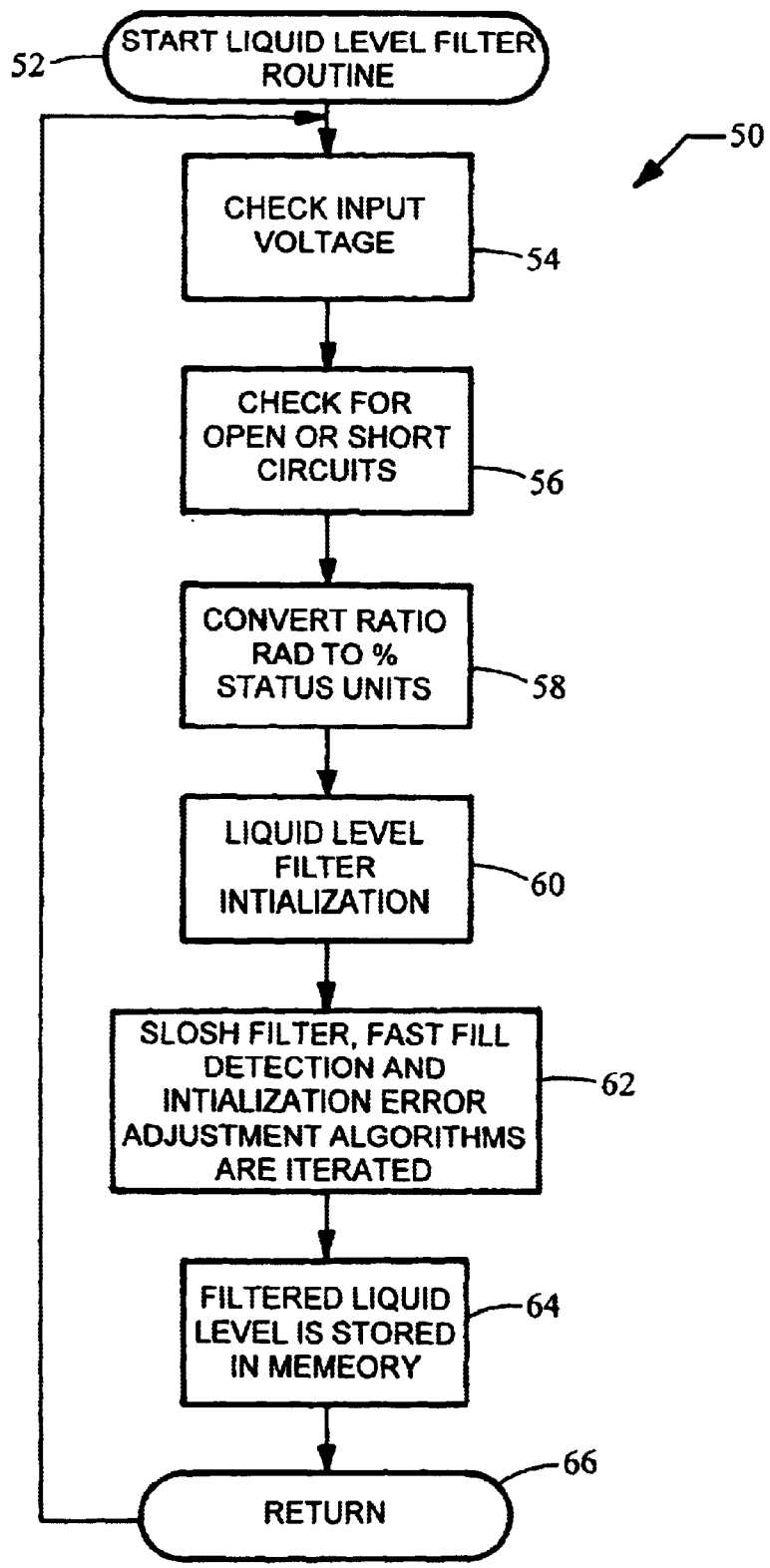
FIG. 2 is a flowchart illustrating a liquid level filter routine, in accordance with the present invention.

In another embodiment of the present invention, a liquid level filter routine 50 is provided, as illustrated in FIG. 2. Liquid level filter routine is initialized at block 52. The liquid level filter routine checks the input voltage for an out of range condition, at block 54. Further, the liquid level filter routine checks the ratio (RAD) for open or short circuits, at block 56, and converts this ratio to percent status units, as represented by block 58. A liquid level filter initialization is then performed, at block 60. At block 62 a slosh filter is iterated along with a fast fill detection and initialization error adjustment algorithm. A filtered liquid level (or percent status) is stored in memory, at block 64, for use in liquid level gauge positioning and low liquid level indicator activation. Preferably, this routine is executed every 120 milliseconds, as represented by block 66.

Further, the present invention provides input voltage diagnostics to ensure supply voltages are within acceptable ranges. Further, open circuit detection is provided to ensure the integrity and accuracy of the ratios calculated. The ratio (RAD) may be converted to a digital liquid level indication. This digital output is then used to display an appropriate liquid level.

Figure 3:
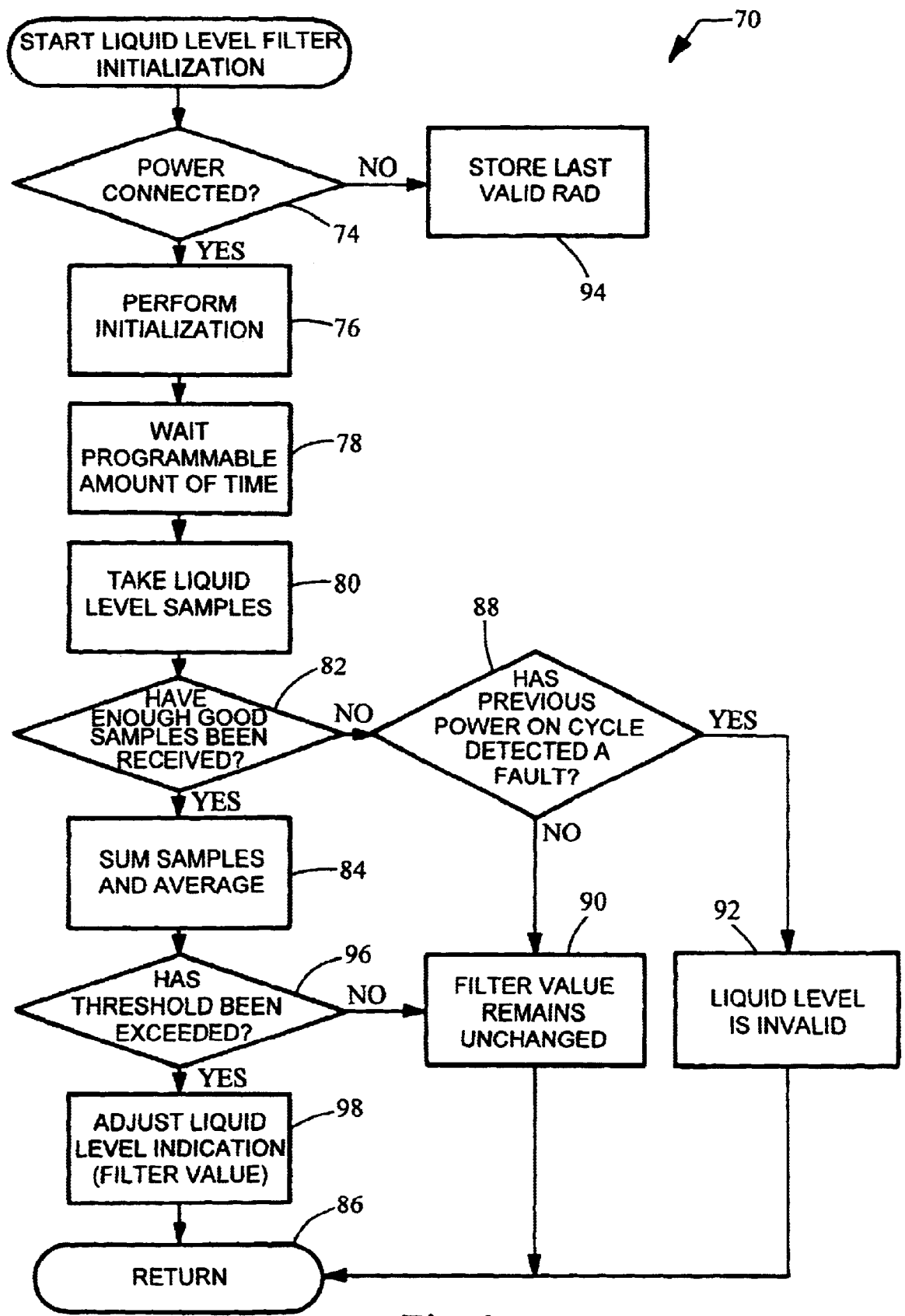
FIG. 3 is a flowchart illustrating a fuel filter initialization routine, in accordance with the present invention.

In yet another embodiment of the present invention, a fuel filter initialization routine 70 is provided to initialize the liquid level indication system at battery connect and at every power up, as illustrated in FIG. 3. For example, a vehicle cluster containing liquid level gauges will perform initialization, at block 76, whenever the cluster transitions into ignition key-on or run stage, as detected at block 74. Generally, a programmable time delay is provided, at block 78, to allow for the analog to digital converter on the sender card to settle and then a programmable number of liquid level samples are taken at an appropriate interval, as represented by block 80. A sample is valid if an open or short is not detected. A programmable number of good samples is required to produce an average. If, however, the number of good samples is less than the required number of good samples and no faults have been detected, the liquid level filter value will remain the same, as represented by block 88 and 90. If, however, the number of good samples is less than the required number of good samples and the previous ignition cycle detected an open or short circuit, then the liquid level will be determined to be invalid, as represented by blocks 88 and 92.

If, however, the number of good samples is equal to or greater than the required number of good samples, the samples are then summed and the sum is averaged, as represented by blocks 82 and 84. A check is made to determine if the liquid level average exceeds a fill threshold when compared to the zero speed or the key-off value, as represented by block 96. If yes, then the filter value is made equal to the average value, at block 98. Further, upon every key-off or power down, the system will store the last valid reading of the liquid level sender ratio or RAD, as represented by block 94. This ensures that the pointer position and liquid level filter can be initialized to the correct values.

At system power on, the last sample, obtained at block 94, will be compared at block 96 to the percentage value obtained from the conversion of the average key-on ratio or (RAD) as calculated, at block 84. This allows for the determination of whether liquid was added or withdrawn from the storage tank and allows for initialization of the liquid level filter if enough liquid has been added or withdrawn.

Figure 4:
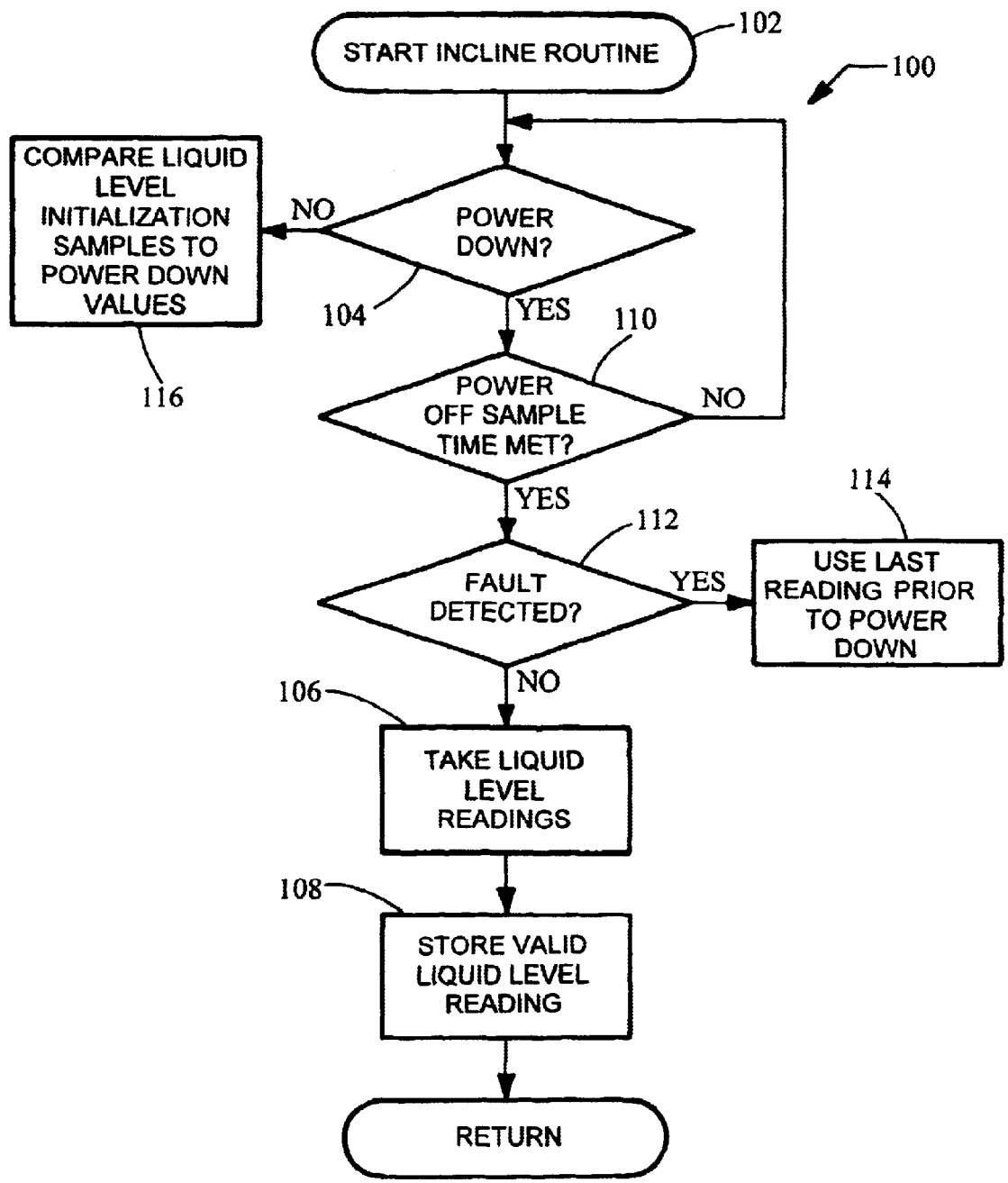
FIG. 4 is a flowchart illustrating a hill or incline park detection routine, in accordance with the present invention.

In a preferred embodiment of the present invention, a hill or incline park detection routine 100 is provided, as illustrated in FIG. 4. This incline detection routine starts, at block 102, and prevents false liquid level initialization when the system is powered on while the vehicle is parked on an incline or hill. A key feature of routine 100 is that a liquid level reading is taken at power off, as represented by blocks 104 and 106. Power off liquid level readings are continuously stored, as represented by block 108, during normal operation and the last valid stored liquid level reading will be used when a power off sample time is met, at block 110, or when a power on transition occurs. However, if an open or short circuit is detected, the last valid reading prior to key-off will be used, as represented by blocks 112 and 114. If an open or short condition is detected and thereafter all readings were open or short, then the gauge will be reading empty and the liquid level filter will not be initialized at power off. At power on fuel initialization samples are compared to power off values, as represented by block 116. However, if thresholds for initialization are not exceeded, then the liquid level filter routine remains at the previous ignition cycle power off filtered value. If the thresholds are exceeded, then the liquid level filter is initialized to the average key-on sample value. Moreover, if the vehicle was moving off of the hill or incline while the system was powered off, then the average initialization value should be equal to the liquid level filter value, thus errors are avoided. If liquid level is added or removed while the vehicle was on the hill or incline, and the changed amount was greater than actually indicated while on the hill or incline, then, the fast fill detection routine will cause the filter to catch up, as soon as the fast fill conditions are met, as will be described in more detail below. In an alternative embodiment, a specified number of power off samples may be summed and averaged to ensure a good slosh free reference.

An initialization error recovery or a leak recovery routine is further provided by the present invention to allow the liquid level filter routine to recover to a correct level within a short amount of time if there is a steady state error between the filter values and successive RAD readings. This routine operates by adding a programmable amount of fixed F delta to the normal base slosh filter F delta each time a successive RAD reading is above (or below) the slosh filter value. F delta is reset to an F delta normal base upon the completion of the sequence. Thus, this routine allows the filter level to recover in a reasonable amount of time due to initialization errors, occurring when a poor power off sample is taken, and when a false liquid level filter initialization occurs due to vehicle movement, or due to addition or removal of a small amount of liquid or due to a leak in the tank. A desired liquid delta normal adjust value is computed based upon tank size, liquid consumption and the value selected for liquid delta normal base and should be as low as feasible to ensure good slosh characteristics.

Figure 5:
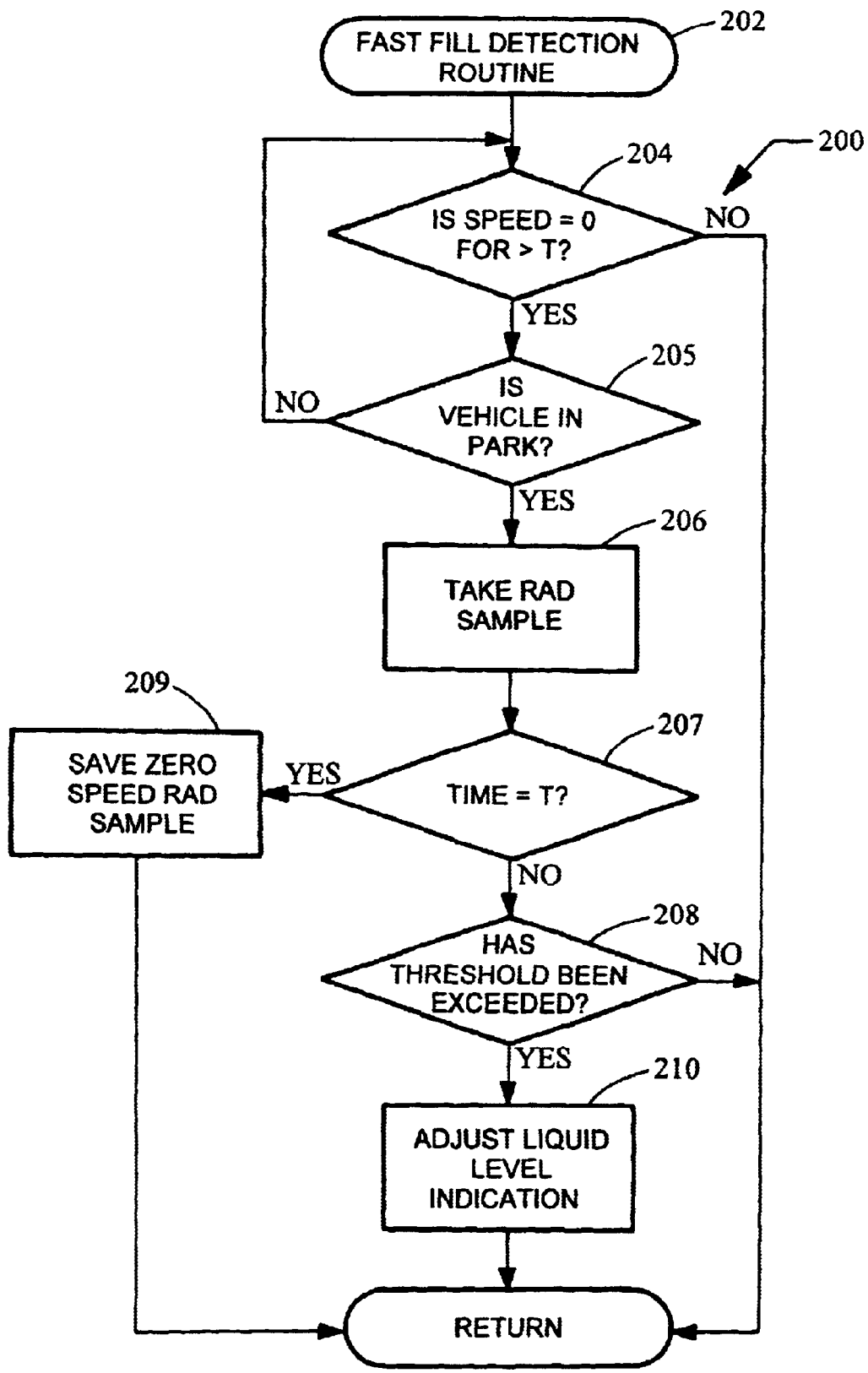
FIG. 5 is a flowchart illustrating a fast fill detection routine, in accordance with the present invention.

In still another embodiment of the present invention, a fast fill detection routine 200 is provided and illustrated in FIG. 5. Fast fill detection routine 200 requires a liquid level reading to be taken, after the routine is initiated at block 202, after a programmable amount of time has elapsed (such as five seconds), after the vehicle speed is zero and the power has been turned on, as represented by blocks. This sample, is saved at time=T as represented by blocks 207 and 209, and is used as the base line comparison for additional liquid level samples while the vehicle is at zero speed and in park, as represented by blocks 204 and 205. The liquid level filter still iterates, as before, based upon the sender sample value, but the fast fill liquid level sample is used for comparison instead of the liquid level filter output. For example, if the liquid level sample exceeds a fast fill threshold, as represented by block 208, then a filter adjust value is switched to a fast fill value to allow a faster pointer movement, at block 210. The fast fill zero speed sample should remain at the last stored value until speed is greater than zero.

In a preferred embodiment, the fast fill sample will not be taken until the vehicle gear position indicates park or neutral for vehicles with transmission gear select position information, as represented by block 205. However, if the transmission gear select position data is invalid or missing or indicates more than one gear, then the fast fill detection routine will default back to taking a fast fill reference while the speed is zero and the time out expires.

Thus, the present invention has many advantages and benefits over the prior art. For example, the system and method of the present invention provides more accurate indication of liquid level. Moreover, the present invention eliminates the need for additional components, such as inclination sensors, thus achieving reduced system cost.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A system for determining a level of a liquid present in a storage container in an automobile, the system comprising:
    a liquid level sensor for determining a preliminary liquid level of the liquid stored in the storage container;
    a vehicle speed sensor for determining the automobile's speed;
    a transmission gear selection sensor for determining a transmission gear position of a transmission of the automobile; and
    a processor for receiving input signals from the liquid level sensor, the vehicle speed sensor and the transmission gear selection sensor for modifying the preliminary liquid level to arrive at a final liquid level indication of the liquid present in the storage container when the automobile's speed is equal to zero, the automobile transmission gear is in park position, and the preliminary liquid level exceeds a predetermined threshold.

2. The system of claim 1, wherein the processor takes a plurality of liquid level readings using the liquid level sensor and then calculates an average to arrive at a preliminary liquid level.

3. The system of claim 1, wherein the processor monitors an ignition key position to determine when to initialize the system.

4. The system of claim 3, wherein a last valid liquid level to battery supply voltage ratio is stored when a vehicle power supply is disconnected.

5. The system of claim 4, wherein the processor uses the last valid liquid level to battery voltage ratio after a system fault has been detected.

6. The system of claim 4, wherein the processor waits a predetermined amount of time before storing the last valid liquid level.

7. The system of claim 1, wherein the processor monitors the vehicle's speed.

8. The system of claim 1, wherein the processor corrects the final liquid level indication by comparing a liquid level initialization sample to a power down value.

9. The system of claim 1, wherein the processor determines whether liquid has been added to the container by monitoring the transmission gear selection sensor.

10. A method for determining a level of a liquid present in a storage container in an automobile the method comprising:
    determining a preliminary liquid level of the liquid stored in the storage container using a liquid level sensor;
    determining the automobile's speed using a vehicle speed sensor;
    determining a transmission gear position of a transmission of the automobile using a transmission gear selection sensor; and
    receiving input signals from the liquid level sensor, the vehicle speed sensor and the transmission gear selection sensor for modifying the preliminary liquid level to arrive at a final liquid level indication of the liquid present in the storage container the automobile's speed is equal to zero, the automobile transmission gear is in park position, and the preliminary liquid level exceeds a predetermined threshold.

11. The method of claim 10, further comprising acquiring a plurality of liquid level readings using the liquid level sensor and then calculating an average to arrive at a preliminary liquid level.

12. The method of claim 10, further comprising monitoring an ignition key position to determine when to initialize the method.

13. The method of claim 12, further comprising storing a last valid liquid level to battery supply voltage ratio when a vehicle power supply is disconnected.

14. The method of claim 13, further comprising utilizing the last valid liquid level to battery voltage ratio after a system fault has been detected.

15. The method of claim 13, further comprising waiting a predetermined amount of time before storing the last valid liquid level.

16. The method of claim 11, further comprising monitoring the vehicle's speed to determine the final liquid level indication.

17. The system of claim 10, further comprising comparing a liquid level initialization sample to a power down value to correct the final liquid level medication.

18. The system of claim 10, further comprising determining whether liquid has been added to the container by monitoring the transmission gear selection sensor.

* * * * *

UNITED STATES PATENT AND TRADEMARK OFFICE
CERTIFICATE OF CORRECTION

PATENT NO.   : 6,644,115 B2
DATED        : November 11, 2003
INVENTOR(S)  : Terry Thomas Cwik et al.

It is certified that error appears in the above-identified patent and that said Letters Patent is hereby corrected as shown below:

<u>Column 6,</u>
Line 5, immediately after "automobile" insert -- , -- (comma).

Signed and Sealed this

Third Day of February, 2004

JON W. DUDAS
*Acting Director of the United States Patent and Trademark Office*